Aug. 7, 1951 L. THOMPSON 2,563,565
PHONOGRAPHIC RECORDING AND RERECORDING APPARATUS
Filed Dec. 22, 1945
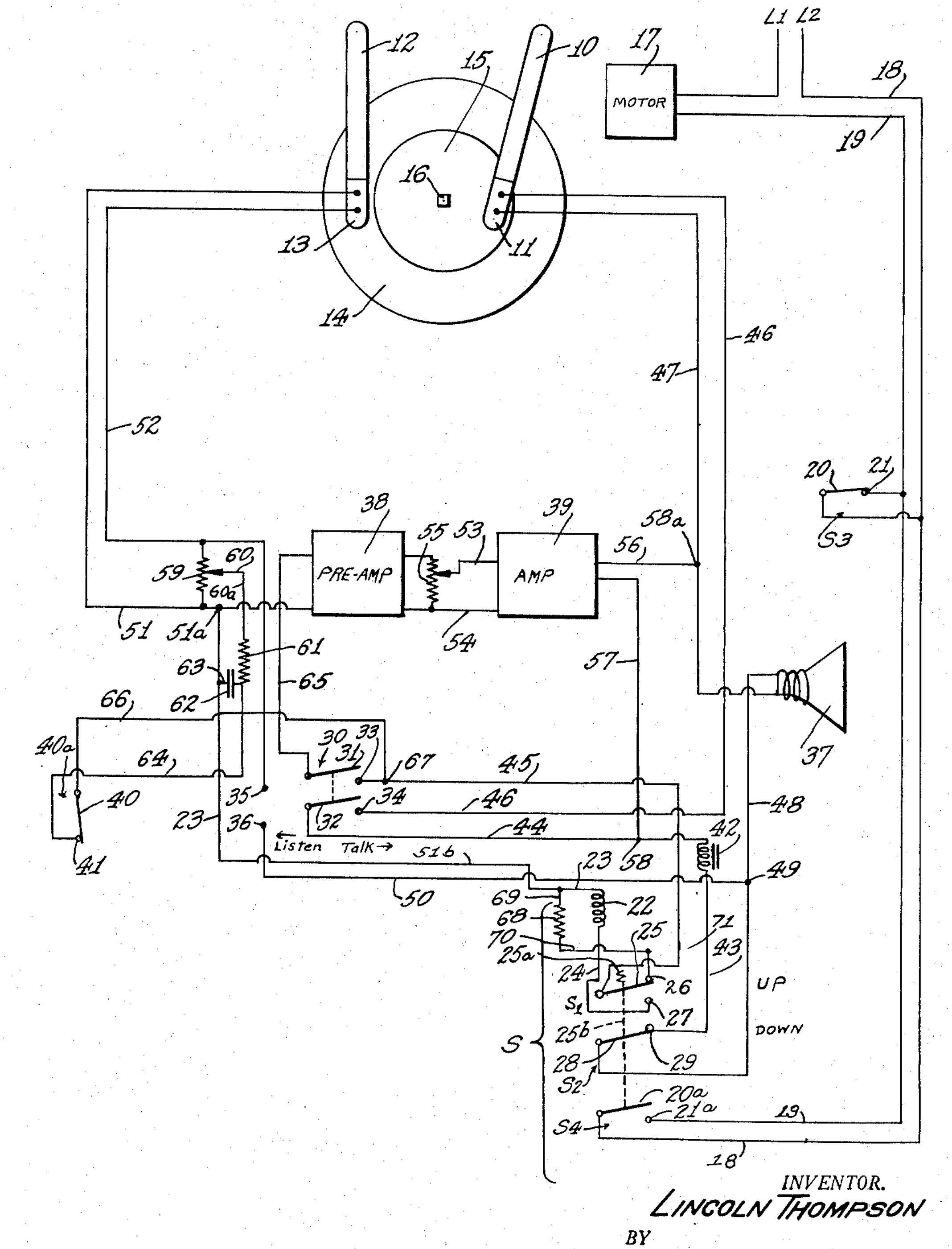
INVENTOR.
LINCOLN THOMPSON
BY
H. G. Manning
ATTORNEY

UNITED STATES PATENT OFFICE 2,563,565

PHONOGRAPHIC RECORDING AND RERECORDING APPARATUS

Lincoln Thompson, Cheshire, Conn., assignor to The Soundscriber Corporation, New Haven, Conn., a corporation of Connecticut Application December 22, 1945, Serial No. 636,837

4 Claims. (Cl. 179—100.4)

This invention relates to phonographs, and more particularly to an apparatus for recording and rerecording with a single turntable.

One object of this invention is to provide an apparatus of the above nature employing a pick-up head and a recording head for making a copy upon a single record of previously recorded material such as music or dictation, and new acoustic material received by a microphone.

A further object is to provide an apparatus of the above nature in which the recording head will selectively record the output from the playback of a previously recorded record and from a microphone receiving new sounds, such as dictation, in such a manner that a single record will be secured containing the previously recorded and the newly produced sounds.

A further object is to provide an apparatus of the above nature in which a loudspeaker is located in the playback-recording-head circuit for permitting the operator to hear the previously recorded material, so that he may thereafter impress upon the microphone new material such as dictation or music to be recorded, on the same disk, in its proper sequential order.

A further object is to provide an apparatus of the above nature in which auxiliary volume controls are introduced into the playback and loudspeaker circuits to compensate for the fact that the normal current level for the actuation of the recording head is much higher than that for actuating the loudspeaker at comfortable listening volume.

A further object is to provide an apparatus of the above nature in which filter means are employed in order to obtain better listening quality where the amplifier is provided with means to produce an accentuated high frequency response during recording.

A further object is to provide a simple compact apparatus with which a correspondent may make original voice letter records and copy records thereof by means of a single turntable supporting both records.

A further object is to provide an apparatus of the above nature which will be simple in construction, inexpensive to manufacture, easy to install and manipulate, compact, ornamental in appearance, and very efficient and durable in use.

In one embodiment of the invention, the first step in the operation consists in recording the original acoustic material at the outer portion of a relatively large disk record. The second step consists of placing a smaller disk record concentrically upon the large disk. The recording head will then be placed at the outer edge of the smaller record, and the playback head in the outer grooves of the previously recorded large record. The circuit connections will be such that the output from the playback head and the microphone will both be simultaneously impressed upon the recording head.

Thus the material already recorded on the outer portion of the large disk will be rerecorded or copied, and new material will also be recorded on the smaller disk. By connecting both the microphone and the playback into the recording head circuit through the amplifier, words spoken into the microphone may be recorded in pauses or silent portions of the original disk to produce a composite record of the material of the original large disk and the new microphone speech.

The present invention has been found to be extremely useful in the teaching of pronunciation and diction in the study of languages, and in the conducting of oral correspondence by means of mailable disk records.

Thus, a pupil in the language class may use this apparatus for taking oral examinations involving pronunciation, translation, etc. The student will listen to a loudspeaker or headphone which plays back questions previously dictated by the teacher and recorded on the outside of a large teacher's disk (e. g. 7 inches in diameter), with silent portions following the questions. The silent portions are arranged to give the student enough time to comprehend the questions and then dictate his replies thereto. The teacher's questions are reproduced by the loudspeaker and simultaneously rerecorded by the electrical apparatus on a small disk (e. g. five inches in diameter) placed upon the teacher's disk and concentric therewith. The pupil's answers will also be recorded on this inside disk. A complete permanent record of both questions and answers will thus be produced, permitting the instructor to grade the examination which may be on any subject matter which might be used in a written examination. The examination may also include pronunciation, conversation, translation, and other matters which could not be tested by a written examination.

As used in the Chinese language course at Yale University, recorded disks have become instruments of self-criticism by the student as well as for grading by the teacher. In this manner the student is easily taught to recognize Chinese tones, sounds, and inflections. The class may listen as a group, or individually, to the records which save the time of the instructor in conducting the necessary fatiguing drill periods.

It was found possible at Yale University by the use of the academically revolutionary apparatus described in this specification to quadruple the number of Army students who could be graduated in each four-month period in the Chinese language course with a given number of teachers. The school had been faced with a shortage of teachers and needed to improve the language drill beyond the endurance of its instructors. By the present invention each pupil may listen to a record over and over again, and may criticize recordings of his own pronunciations in comparison with that of the teacher.

The student may also take oral examinations individually without the presence of the teacher—recording answers to the questions asked by the instructor on the original record.

In the conducting of oral correspondence, the method of the present invention can be of considerable importance because it permits the sender to make a voice copy simply and quickly on his specially adapted dictation apparatus of the original record containing the voice message which is to be mailed.

If desired, the disk record which is retained for filing may have any suitable additional special remarks or comments dictated upon it. This system produces a file copy of a voice letter and saves the expense of typewriting.

For "voice" letters, the original dictation will in general be limited to the outside area of a large disk record, and the voice copy will be made on an interior smaller size disk record. It will be understood, however, that while either the larger or smaller disk may be mailed, it will usually be more convenient and less expensive to mail the smaller disk, as this will permit the blank central area of the larger disk to be used for additional recording before filing it away. It is further understood that the "original" record may be the smaller disk, in which case the copy will be the outer area of the larger disk.

When this "voice" correspondence process is carried out on a dual recorder (with a pair of turntables), two voice copy records may be made simultaneously—one on the turntable on which the original recording was made, and a second on another turntable.

It will also be understood that the present invention may be used to rerecord previously recorded music and selectively record on the same disk newly produced music so as to give the illusion of a two-piece orchestra, or to supply an accompaniment to a previously recorded vocal song.

With these and other objects in view, there has been illustrated on the accompanying drawing one form in which the invention may conveniently be embodied in practice.

In the drawing, the single figure represents a diagrammatic view of a recording and rerecording apparatus embodying the invention.

Referring now to the drawing, in which like reference numerals denote corresponding parts, the numeral 10 indicates a recording arm carrying on its end a vertically movable recording head 11, pivoted to said arm on a horizontal axis. Provision is also made of a reproducer arm 12 having a playback head 13 similarly pivoted thereto.

As disclosed in applicant's prior Patent No. 2,250,242, granted July 22, 1941, entitled "Disk Dictating Machine," during normal recording-playback use of the apparatus disclosed therein, the recording head 11 is adapted to be lifted from engagement with the disk record when the "talk-listen" control therein disclosed is at the "listen" position, and the amplifier circuits will be suitably selected for reproduction. When the control is set at the "talk" position, the recording stylus will engage the record and indent a continuous groove thereon—the amplifier circuits being then arranged for recording.

In the present invention the playback head 13 is adapted to be located upon a large previously-recorded "teacher's" disk 14, preferably of thin stiff material such as "Vinylite" or aluminum such as was described in applicant's prior Reissue Patent No. 22,183, granted September 22, 1942, entitled "Apparatus for Recording Sound on Thin Disks." The numeral 15 indicates a smaller "student's" disk of the same material resting upon the large disk 14 and held concentric therewith by a turntable spindle 16, preferably square in shape, as shown.

The turntable is driven by a motor 17 supplied with A. C. from a pair of line conductors $L_1$, $L_2$, by means of a pair of conductors 18, 19 connected to a motor control switch $S_3$ preferably mounted on the recorder cabinet (not shown), and having a movable contact 20 and a fixed contact 21, and a motor control switch $S_4$ carried by a hand microphone set S.

In order to manually control the apparatus herein disclosed for recording, rerecording, and playback, the hand microphone set S is equipped with a three-pole "press to dictate" switch including the three sections $S_1$, $S_2$, and $S_4$. The set S has a microphone voice coil 22 which is connected by means of a conductor 24 to a fixed contact 27 of the section $S_1$ of the three-pole switch.

The switch section $S_1$ also has a movable contact arm 25 which is adapted to swing between a pair of fixed contacts 26 and 27—said arm 25 being normally held in the "up" position shown on the drawing by an insulated connector rod 25*b* urged upwardly by a spring 25*a*. The rod 25*b* mechanically connects the switch arm 25 with the switch arms 28 and 20*a* and causes all three switch arms to move up and down in unison.

The switch arm 28 is adapted to engage a fixed contact 29 when in its normal upper position.

The movable contact 20*a* of the switch section $S_4$ is adapted when "down" to engage a fixed contact 21*a*—said contacts 20*a* and 21*a* being connected to the conductors 18, 19, previously mentioned.

For controlling the apparatus when used for normal "recording and playback" operation, provision is made on the cabinet of a "talk-listen" selector switch 30 of the double-pole double-throw type, having a pair of movable contact arms 31, 32 insulated from each other and mounted to swing in unison. The switch 30 is mechanically connected to a cam mechanism (not shown) which when in "listen" position lifts the recording head of the standard machine from the record as described in the above-mentioned Patent No. 2,250,242, and when in "talk" position lowers the recording head so that its stylus contacts the record.

This selector switch 30 also includes a pair of fixed "talk" contacts 33, 34 and a similar pair of "listen" contacts 35, 36, as shown.

Provision is also made of a switch 40*a* having a movable switch arm 40 which is adapted to be engaged with a fixed contact 41 whenever it is desired to convert the "standard" apparatus into condition for "recording and rerecording and playback" according to the invention herein disclosed.

In order to permit the "student" or other operator to listen to the playback of the material previously recorded on the outer record 14, provision is made of a loudspeaker 37 (or headphone) which receives the output from a main amplifier 39 having a preamplifier 38 connected therewith.

During normal recording as performed on a "standard" machine, it is essential that the higher frequencies be accentuated as described in the prior patent to Kleber and Thompson No. 2,239,042, granted April 22, 1941, and entitled "Wave Recording and Reproduction."

With the present invention this accentuation must be compensated for during listening periods when the three-pole switch ($S_1$—$S_2$—$S_4$) is in the "up" position, as otherwise the loudspeaker which is connected in parallel across the recording head during rerecording, will sound too high pitched.

In order to accomplish such compensation, without appreciably affecting the amplifier response necessary for good rerecording, provision is made of a choke 42 arranged in series with the loudspeaker 37, and which is operative when the three pole switch is in the normal "up" position.

The choke 42 is connected by a conductor 43 to the contact 29 and the switch arm 28, when "up," is connected by the conductor 48 to the loudspeaker 37.

The choke 42 is connected at its other end by a conductor 44 to the arm 32 of the switch 30, and is also connected from a junction 58 to a conductor 57 leading to the output of the amplifier 39.

The contact 33 of the switch 30 is connected by a conductor 45 to the movable arm 25 of the switch section $S_1$. Also the contact 34 of the switch 30 is connected by a conductor 46 to the recording and rerecording head 11 which is connected by a conductor 47 to the loudspeaker 37, and also connected from a junction point 58*a* to a conductor 56 leading to the output of the amplifier 39.

The conductor 48 has a junction 49 which is connected by a conductor 50 to the "listen" contact 36 of the switch 30 for use on "standard" operation. The conductor 51 serves to connect the playback head 13 with one input terminal of the preamplifier 38 and a conductor 52 connects the playback head 13 with the "listen" contact 35 of the switch 30. The conductor 51 has a junction 51*a* which is connected by a conductor 51*b* to the conductor 23, previously mentioned. The output terminals of the preamplifier 38 are connected to the main amplifier 39 by conductors 53, 54.

Provision is also made of a potentiometer 55 connecting the conductors 53, 54 for controlling the volume of amplification.

In order to control the volume of the loudspeaker or headphone independent of the recording volume, provision is also made of a potentiometer 59 connected to the conductors 51, 52, respectively. The potentiometer 59 is connected by a variable contact 60 to a conductor 60*a* leading to a fixed resistor 61 connected to a condenser 62, which in turn is connected by a conductor 63 to the conductor 51*b*, while a conductor 64 connects the resistance 61 to the contact 41 of the switch 40*a*.

The resistor 61 and the condenser 62 further compensate for the high frequency accentuation previously mentioned.

The movable arm 31 of the switch 30 is connected to an input terminal of the preamplifier 38 by a conductor 65, and the movable arm 40 of the switch 40*a* is connected by a conductor 66 to a junction 67 on the conductor 45.

In order to prevent oscillation of the amplifier when the microphone is disconnected from it (in the "up" position of the three-pole switch) provision is made of a dummy load resistance 68 which is connected by a conductor 69 to the conductor 23, and by a conductor 70 to the fixed contact 26.

*Operation*

When the "talk-listen" selector of the switch 30 is in the "listen" position, the recording stylus will be raised from the record as in the apparatus disclosed in the prior Patent No. 2,250,242. Listening will then be the same as though the standard machine had no special rerecording feature, and the amplified playback output will go to the loudspeaker 37 with the choke 42 short-circuited and with full pickup volume applied to the amplifier input.

When the rod 25*b* is "up" in "listen-rerecord" position, the microphone 22 will be disconnected, and the dummy load 68 will be thrown across the amplifier input. In this condition the pickup 13 will feed into the amplifier input for rerecording with volume reduced by the volume control (59, 60), the high frequencies will be attenuated by the condenser 62, and the output to the loudspeaker 37 will be through the choke 42. A good listening quality will be thus maintained.

When the rod 25*b* of the hand set S is pressed down to "talk-record" position, the arm 25 of the switch $S_1$, the arm 28 of the switch $S_2$, and the arm 20*a* of the switch $S_4$ will engage the contacts 27, 29, 21*a*, respectively. The dummy load will then be inactive, the microphone 22 will be connected to the input of the amplifier, the pickup will be connected across the microphone, but attenuated, and the loudspeaker will be disconnected from the amplifier output.

With the switch 40*a* closed, the playback input will be applied to the amplifier at all times whether the microphone switch arm 25 is up or down.

In the operation of the present invention for "recording-rerecording and playback," the switch $S_3$ should be closed to cause the motor to operate continuously.

Under standard recording-playback operation, however, the switch $S_3$ should be open. In this condition when the switch in the microphone hand set S is pressed "down," the loudspeaker circuit will be opened; but the microphone will not connect into said circuit.

One advantage of the present invention is that the apparatus permits recording and rerecording on the same disk record turntable and may easily be combined with a standard type of dictating machine such as disclosed in the Patent 2,250,242, mentioned above, and may be converted into condition for standard operation for recording and playback only by means of the selector "switch" 40*a*.

A further advantage is that by making the rerecorded copy on the same turntable as the original record, the fidelity of the copy will be better than if another recording turntable is used, because any speed changes or flutter in the turntable rotation will be cancelled out since the two records are simultaneously subjected to the same momentary speed changes.

It will also be understood that one or more additional recording heads on other recording devices may be connected in parallel with the recording head of the first turntable for making simultaneous copies.

While there has been disclosed in this specification one form in which the invention may be embodied, it is to be understood that this form is shown for the purpose of illustration only, and that the invention is not to be limited to the specific disclosure, but may be modified and embodied in various other forms. In short, the invention includes all the modifications and embodiments coming within scope of the following claims.

Having thus fully described the invention, what is claimed as new and for which it is desired to secure Letters Patent is:

1. In a phonographic rerecording apparatus, a single turntable, a first thin record disk supported thereon for rotation therewith and having the outer portion of its surface provided with previously recorded sound grooves, a smaller central thin disk record resting on and in direct contact with said first disk for rotation therewith, a playback head resting on said first disk, a recording head having an indenting stylus resting with high pressure on said smaller disk, an amplifier connected with said playback head, means for connecting the output of said amplifier to said recording head to rerecord a transcription of said first disk on said smaller disk, a microphone, means to connect said microphone to the input of said amplifier to selectively record fresh sounds impressed upon said microphone on said smaller disk, and a loud-speaker in the output of said amplifier to render audible the transcription of the first disk being played back.

2. In a phonographic rerecording apparatus, a single turntable, a first thin record disk supported thereon for rotation therewith and having the outer portion of its surface provided with previously recorded speech sound grooves, a smaller central thin record disk resting on and in direct contact with said first disk for rotation therewith, a playback head resting on said first disk, a recording head of the high-pressure indenting stylus type resting on said smaller disk, an amplifier connected with said playback head, means for connecting the output of said amplifier to said recording head to rerecord a transcription from said first disk upon said smaller disk, a microphone, means to connect said microphone with the input of said amplifier to selectively record fresh sounds impressed upon said microphone on said smaller disk, and a dummy load resistor located in the input circuit of said amplifier when the apparatus is in the listen-record condition and having sufficient resistance to prevent undue oscillation of said amplifier.

3. In a phonographic rerecording apparatus, a single turntable, a first thin record disk supported thereon for rotation therewith and having the outer portion of its surface provided with previously recorded speech sound grooves, a smaller thin record disk resting on, concentric with, and in direct contact with said first disk for rotation therewith, a playback head resting on said first disk, a recording head of the high-pressure indenting stylus type resting on said smaller disk, an amplifier connected with said playback head, means for connecting the output of said amplifier to said recording head to rerecord a transcription from said first disk upon said smaller disk, a microphone, means to connect said microphone to the input of said amplifier to selectively record fresh sounds impressed upon said microphone on said smaller disk, and means for variably controlling the volume of the output of said playback independently of the volume of said recorder.

4. In a phonograph rerecording apparatus, a single turntable, a first thin record disk supported thereon for rotation therewith and having the outer portion of its surface provided with previously recorded speech sound grooves, a smaller central thin record disk concentric with and in direct contact with said first disk for rotation therewith, a playback head resting on said first disk, a recording head resting on said smaller disk, an amplifier connected with said playback head, means for connecting the output of said amplifier to said recording head to rerecord a transcription from said first disk upon said smaller disk, a loudspeaker in the output circuit of said amplifier, a microphone, means to connect said microphone to the input of said amplifier to selectively record fresh sounds impressed upon said microphone on said smaller disk, and a choke coil in the loudspeaker input circuit having sufficient inductance to reduce to normal the high-pitched tones of the transcription.

LINCOLN THOMPSON.

REFERENCES CITED

The following references are of record in the file of this patent:

UNITED STATES PATENTS

| Number | Name | Date |
|---|---|---|
| 1,719,339 | Reddie | July 2, 1929 |
| 1,788,103 | Hanna | Jan. 6, 1931 |
| 1,946,565 | Baumann | Feb. 13, 1934 |
| 2,008,699 | Hammond | July 23, 1935 |
| 2,008,708 | Hammond | July 23, 1935 |
| 2,116,314 | Jenkins | May 3, 1938 |
| 2,230,003 | Mitchell | Jan. 28, 1941 |
| 2,314,345 | Cortella | Mar. 23, 1943 |
| 2,354,176 | Goldsmith | July 18, 1944 |
| 2,369,088 | Thompson | Feb. 6, 1945 |
| 2,373,560 | Hanert | Apr. 10, 1945 |